United States Patent [19]

Jacobi et al.

[11] Patent Number: 4,807,949
[45] Date of Patent: Feb. 28, 1989

[54] LIGHT WAVEGUIDE SWITCH

[75] Inventors: Hubert Jacobi; Ralf R. Volkmar, both of Berlin, Fed. Rep. of Germany

[73] Assignee: Siemens Aktiengesellschaft, Berlin and Munich, Fed. Rep. of Germany

[21] Appl. No.: 146,737

[22] Filed: Jan. 21, 1988

[30] Foreign Application Priority Data

Jan. 23, 1987 [DE] Fed. Rep. of Germany ....... 8701106

[51] Int. Cl.$^4$ ................................................ G02B 6/36
[52] U.S. Cl. .................................. 350/96.2; 350/96.21
[58] Field of Search ........................................ 250/227; 350/96.13–96.15, 96.2, 96.21

[56] References Cited

U.S. PATENT DOCUMENTS 4,607,910 8/1986 Thurenius .......................... 350/96.2

FOREIGN PATENT DOCUMENTS 0075917 4/1983 European Pat. Off. .
3335679 4/1985 Fed. Rep. of Germany .

Primary Examiner—John D. Lee
Assistant Examiner—John Ngo

[57] ABSTRACT

A light waveguide switch which has a base member with a flat surface sub-divided by a longitudinally extending channel, a flat plate of a constant thickness being pre-cut to form a tongue and a carrier member, waveguides secured to the tongue and carrier member to be in alignment when the tongue engages the flat surface of the carrier member and an adjustable stop for defining a second switching position characterized by the adjustable stop being formed by a resilient arm secured on the carrier member to extend across the tongue adjacent the free end thereof, and having a projection forming a point contact second stop with the tongue and having the free end of the arm being connected to the carrier member by an adjustment screw so that a projection on the arm forms an adjustable stop to determine the second position.

15 Claims, 2 Drawing Sheets

LIGHT WAVEGUIDE SWITCH

BACKGROUND OF THE INVENTION

The present invention is directed to a light waveguide switch having a switch tongue which coacts with a carrier part, with both the switch tongue and part being composed of flat material and the tongue being deflectible transversely relative to its longitudinal length. The tongue and carrier are mounted on a base member which forms a seating surface for the switch tongue when it is in the first of two switch positions and also supports an adjustable stop which determines the position of the switch tongue while in the second switch position.

A light waveguide switch is disclosed in U.S. patent application Ser. No. 706,233, filed Feb. 27, 1985, which claims priority from German Application No. P 31 38 686. In this light waveguide switch, a switch tongue and carrier part are composed of a spring sheet, which sheet, on an upper surface, carries a fiber-shaped light waveguide for both the tongue and the carrier part and on an under surface also has a second fibershaped light waveguide. As illustrated in this application, the switch tongue and carrier part are interconnected as one piece of the sheet and are separated from each other by at least one cutout portion. This sheet-like plate is secured onto a highly precision, planar surface of a base member which has a groove for the light waveguides secured to the tongue. The planar surface forms a seating surface or stop surface for a first switch position of the tongue of the switch. In the first switch position, the end faces of the light waveguides secured to the two surfaces of the tongue will be positioned opposite and in alignment with the two waveguides secured to the carrier. Since the carrier and tongue are formed of the same plate which has the same thickness, the alignment is down to the micrometer range.

In a second switch position, the switch tongue is deflected transversely relative to the running direction, and the end face of the lower light waveguide of the switch tongue is moved to be in alignment with the upper light waveguide on the carrier plate and to be aligned therewith. To this end, it is necessary to provide a height precision stop for the switch tongue in the second position, which limits the movement of the switch tongue so that the end face of the light waveguides to be coupled in the second switch position are exactly aligned opposite one another. To this end, published Germany Application 33 35 679 discloses that a trapezoidal spring clip having ends supported on either the sheet forming the tongue and carrier or on the base member is provided on both sides of the switch tongue, and each of these have a laterally extending projection, which will engage the tongue as it moves toward the second position. Due to the resilient nature of the clip, the position of this lateral projection can be adjusted with the assistance of a screw fastener that extends through the cross member and is connected to the base member. If the switch tongue has outwardly extending ears, they are the ones that engage these protrusions or projections, and the projections form the second stop, against which the switch tongue is supported in its second switch position. However, two adjustment elements, namely the two screws, one for each spring clip, must be adjusted for adjusting the position of the switch tongue in the second switch position. In addition, the position of the two stops, which differs in height, must also be avoided, because then the switch tongue would only be initially supported against one of the two stops and would then have a tendency to pivot on the engaged stop to pivot the tongue around its longitudinal axis out of the planar position.

SUMMARY OF THE INVENTION

It is an object of the present invention to improve the light waveguide switch having a switch tongue that moves between a first and second position relative to a carrier member by providing a stop which is stable over the long term and defines the position of the switch tongue in a second switch position. This stop is constructed to enable adjustment in an uncomplicated fashion.

In order to achieve this object, the present invention is directed to an improvement in a light waveguide switch having a switch tongue composed of a flat material and deflectible transversely in its longitudinal direction relative to a sheetlike carrier member, said carrier member and tongue being secured on a base member, which has a planar seating surface for receiving the switch tongue and defining the first of two switch positions of the tongue and has adjustable stop means which defines the position of the switch tongue in the second switch position. The improvement is that the adjustable stop means is formed by a resilient arm which extends transversely over the switch tongue and has one end fixed to the base member, the free end of said arm being connected to the base member by an adjustment mechanism, and said arm being provided with a projection directed towards the switch tongue to provide an adjustable stop surface for the switch tongue.

As a result of this construction of the invention, only the actuation of a single screw is now required when adjusting the position of the adjustable stop.

It can be provided in a further development of the invention that the projection is composed of a conically stamped depression, which is stamped out of a portion of the arm which is formed of a band of material and that the stop is formed by the tip of this deformed depression.

This creates a stop having an especially precise action, whereby only a punctiform contacting surface is present between the switch tongue and the arm so that the return precision of the stop is extremely high.

It can also be provided within the framework of the present invention that the arm is a one-piece component part of a fastening rail which extends parallel to the switch tongue and is connected to the base member. The fastening elements used to secure the spring sheet plate, in which the tongue and carrier member have been formed, to the base member can, simultaneously, secure the rail portion of the one-piece component forming the arm to the base member so that the assembly of the waveguide switch is significantly simplified.

Finally, it is also provided that the additional component part, which forms a bearing surface for the stop is attached to the tongue to be engaged by the stop of the arm. This development of the invention advantageously enables the stop to symmetrically contact the switch tongue, since the component part that is connected to the switch tongue can be fashioned so that it bridges the end of the light waveguide fixed to the upper surface of the switch tongue. Therefore, the stop can contact the switch tongue precisely above the end of the light waveguide without damaging the waveguide.

Other advantages and features of the invention will be readily apparent from the following description of the preferred embodiments, the drawings and claims.

DESCRIPTION OF THE PREFERRED EMBODIMENTS

Figure 1:
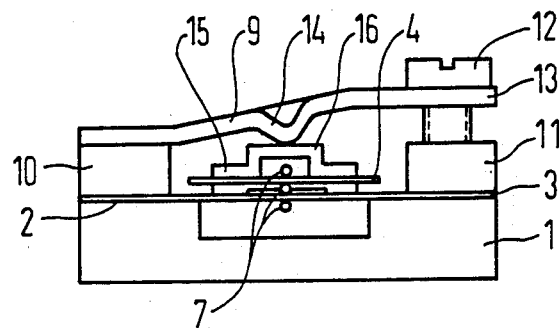
FIG. 1 is an end view of a light waveguide switch in accordance with the present invention.

The principles of the present invention are particularly useful in a light waveguide switch which has a base member 1 which is composed of a solid member such as a plate that is provided with a highly precision, planar, flat surface 2 on one side. The surface 2 is subdivided into two portions by a longitudinally extending channel-like recess 8. A sheet member 3 of spring metal is fixed to the flat side 2, and the thickness of this sheet material 3 has an especially high constancy over the entire region of the plate.

Figure 3:
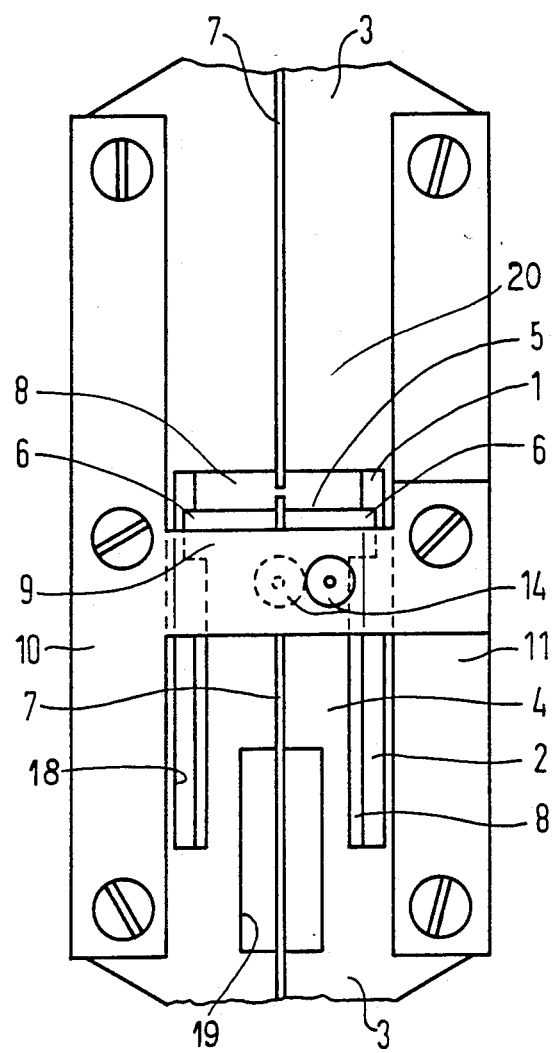
FIG. 3 is a plan view of a switch, such as illustrated in FIGS. 1 and 2.

The spring or sheet 3, as best illustrated in FIG. 3, has a U-shaped cutout 18 and a rectangular cutout 19 to form a switch tongue 4, which has a free end 5 movable relative to a carrier portion 20. In forming the cutout 18, the tongue adjacent the free edge 5 has two laterally extending ears or projections 6, which are held on the flat surface 2 adjacent the recess 8 to form one stop position.

With the ears 6 on the stop position, the upper surface of the tongue 2 lies in the plane of the upper surface of the carrier 20 and the lower planar surface of the tongue 4 lies in the lower planar surface of the carrier 20. Thus, waveguides 7 secured to the upper surface of the tongue and the carrier 20 in a vertical plane will also be aligned vertically so that the end faces, which are spaced apart as illustrated in FIG. 3, will be aligned for optimum communication. In a similar manner, waveguides 7 on the lower surface of the tongue 4 and on the lower surface of the carrier 20 will be aligned.

Figure 2:
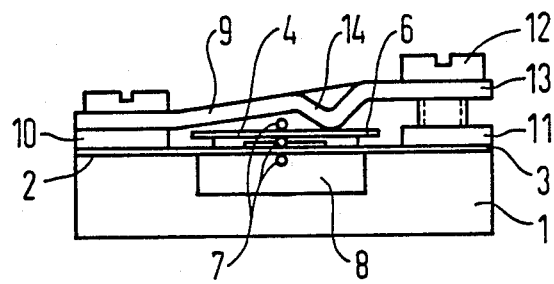
FIG. 2 is an end view of a modification of a light waveguide switch in accordance with the present invention.

When the ears or projections 6 engage the surface 2 of the member 1, this forms a first position for the tongue. The tongue 4 can be deflected from this first position to a second position out of the plane of the carrier 20, as illustrated in FIGS. 1 and 2. This second position is controlled by an adjustable stop so that the fiber 7 on the lower surface of the tongue is aligned with the fiber 7 on the upper surface of the carrier, and the fiber on the lower surface of the carrier and the fiber on the upper surface of the tongue are out of optical connection. Movement from the first to the second position can be due to the actuation of a magnetic coil (not illustrated), which causes the tongue to shift between the two positions against the resilient force urging it in the opposite direction.

When the switch tongue is moved out of the first switch position towards the second switch position, it is necessary to limit the amount of movement to an exact amount so that an optical coupling of the light waveguides secured to the upper side of the carrier 20 will be in alignment with the optical fiber secured to the lower surface of the tongue. Thus, it is necessary to precisely set the distance of the movement of the free end 5 of the switch tongue 4 from the flat surface 2 of the base member 1 to determine the second switch position.

In accordance with the present invention, this is accomplished by a resilient arm 9, which is provided and extends transversely to the longitudinally extent of the switch tongue 4 adjacent or in the proximity of the free end 5 of the switch tongue.

As illustrated in FIG. 3, the arm 9 can be a one-piece component part of a fastening rail 10, which rail is secured to the member 1 by screws which secure one side of the plate 3. A second rail 11 is secured on the opposite side of the member by screws which also secure the opposite side of the plate 3 and extends parallel to the light waveguide 7 and to the rail 10.

The arm 9 is provided with a pre-stress and can be moved towards the base member 1 or, respectively, the rail 11 opposite the action of this pre-stress by being moved with the assistance of a screw 12 (FIGS. 1 and 2), which extends through an opening in a free end 13 of the arm 9 and is threaded into the rail 11 and the base 1.

The arm 9 is composed of a band or strip-shaped material and has a conical stamped depression 14, which is located above the switch tongue 4 and extends directly towards the switch tongue. This depression 14 has a tip which acts as the stop for the switch tongue. In the embodiment of FIG. 1, the switch tongue carries a component part 15, which is connected to the switch tongue, and this part 15 extends transverse relative to the longitudinal extent of the switch tongue, and has a standing portion that extends over the waveguide 7 which forms a platform 16 with a bearing surface on which the depression 14 of the arm 9 engages. As illustrated, the point of the depression 14 engages the platform 16 immediately above the waveguide 7 so that the forces applied on the tongue are symmetrical relative to the axis of the waveguides.

In the modification of FIG. 2, the point of the depression 14 acts directly on the tongue and is offset laterally from the waveguides 7 so that it would not harm the waveguides. In both cases, it is noted that the point of the depression forms a point contact of the stop with the tongue or a component part attached to the tongue, so that a precise adjustment of the second switch position can be obtained by the arm 9, whose position is adjusted by the screw 12.

Although various minor modifications may be suggested by those versed in the art, it should be understood that we wish to embody within the scope of the patent granted hereon all such modifications as reasonably and properly come within the scope of our contribution to the art.

We claim:

1. In a light waveguide switch having a switch tongue composed of a flat sheet of material and being deflectible transversely relatively to its longitudinal extent, said switch including a base member forming a seating surface for the switch tongue and a carrier part, with the seating surface defining a first of two switch positions for the switch tongue and adjustable stop means secured to the base member for positioning the switch tongue in the second switch position, the improvements comprising the adjustable stop means being formed by a resilient arm extending transversely to the longitudinal extent of the switch tongue and having one end secured to the base member, a free end of the resilient arm being connected to the base member by an adjustment mechanism and said arm being provided with a projection directed towards the switch tongue, said projection engaging the switch tongue in the area adjacent a center of the tongue adjacent the free end as the tongue is in the second switch position.

2. In a light waveguide switch according to claim 1, wherein the arm is a one-piece component part of a fastening rail extending parallel to the switch tongue and being connected to said base member on one side of said tongue.

3. In a light waveguide switch according to claim 2, wherein the switch tongue includes a component part having a platform, said component part being secured to the tongue with a portion extending over the light waveguide secured to the tongue and the platform forming a bearing surface for the projection of the arm to engage.

4. In a light waveguide switch according to claim 1, wherein the projection on the arm is formed by an integral, conical depression formed in said arm terminating in a tip.

5. In a light waveguide switch according to claim 4, wherein the arm is a one-piece component part of a fastening rail, which extends parallel to said switch tongue and is connected to said base member alongside of said switch tongue.

6. In a light waveguide switch according to claim 5, wherein the tongue includes an additional component having a platform forming a bearing surface for said tip, said additional component being secured to said tongue to extend over the waveguide attached to an upper surface thereof.

7. In a light waveguide switch according to claim 4, wherein the conical depression forming the tip is positioned so that the tip engages the tongue laterally offset from the waveguide so that no damage is caused to the waveguide by said stop.

8. In a light waveguide switch according to claim 4, wherein said tongue includes an additional component with a platform forming a bearing surface, said additional component being secured to a surface of the tongue to extend over the waveguide with the bearing surface engaging the tip which is substantially aligned with the waveguides therebeneath.

9. In a light waveguide switch according to claim 1, wherein said projection is positioned on said arm with the tip engaging the tongue adjacent the waveguide so that no damage is done to the waveguide by said stop.

10. In a waveguide switch according to claim 1, wherein the tongue has an additional component with a platform forming a bearing surface, said additional component being mounted on said tongue with the bearing surface positioned above the waveguides, and said projection of the arm engaging the bearing surface approximately directly over the waveguides on said tongue.

11. In a light waveguide switch having a switch tongue being composed of a flat sheet of material, having a pair of sides and being deflectible transversely relatively to its longitudinal extent, said switch including a base member forming a seating surface for the switch tongue and a carrier part, said seating surface defining a first of two switch positions for the switch tongue and adjustable stop means secured to the base member for positioning the switch tongue in the second switch position, the improvements comprising the adjustable stop means being formed by a resilient arm extending transversely across the switch tongue and to the longitudinal extent of the switch tongue, said resilient arm having one end secured to the base member adjacent one of the pairs of sides of the tongue, a free end of the resilient arm being connected to the base member adjacent the other side of the pair of sides by an adjustment mechanism and said arm being provided with a projection directed towards the switch tongue, said projection engaging the switch tongue in the area adjacent a center of the tongue adjacent the free end as the tongue is in the second switch position.

12. In a light waveguide switch according to claim 11, wherein the arm is a one-piece component part including a fastening rail extending at a right angle to the arm, said fastening rail being said one end and being connected to said base member on said one side of said tongue to extend parallel to the tongue.

13. In a light waveguide switch according to claim 12, wherein the switch tongue includes a component part having a platform, said component part being secured to the tongue with a portion extending over the light waveguide secured to the tongue and the platform forming a bearing surface for the projection of the arm to engage.

14. In a light waveguide switch according to claim 13, wherein the projection on the arm is formed by an integral, conical depression formed in said arm terminating in a tip.

15. In a light waveguide switch according to claim 12, wherein said projection is positioned on said arm with a tip of the projection engaging the tongue adjacent the waveguide so that no damage is done to the waveguide by said stop.

* * * * *